Aug. 4, 1970

R. D. BARTON 3,523,241

FLEXIBLE SEARCH SHOE

Filed Nov. 26, 1968

INVENTOR.
ROBERT D. BARTON

BY John H. Gallagher

ATTORNEY

United States Patent Office 3,523,241
Patented Aug. 4, 1970

---

3,523,241
FLEXIBLE SEARCH SHOE
Robert D. Barton, Houston, Tex., assignor to American Machine & Foundry Company, New York, N.Y., a corporation of New Jersey
Filed Nov. 26, 1968, Ser. No. 779,149
Int. Cl. G01r *33/12*
U.S. Cl. 324—37          10 Claims

ABSTRACT OF THE DISCLOSURE

A search shoe for use in nondestructive testing of ferromagnetic tubular members and including an object engaging member made of a thin, flexible, and resilient nonmagnetic material and having a preformed curved surface whose radius of curvature is less than that of the smallest of the tubular members to be tested whose diameters are within a given range. The object engaging member may be resiliently urged into a closely-conforming contact with the surface of any tubular member to be inspected which falls within said range.

BACKGROUND OF THE INVENTION

Field of the invention

This invention relates to a flexible search shoe which is to be used in the nondestructive testing of ferromagnetic tubular members and which is to engage in a sliding and closely-conforming contact with a tubular member having any one of various different diameters.

Description of the prior art

In the nondestructive testing of ferromagnetic tubular objects such as steel pipes it is customary to pass a unidirectional magnetic flux through the portion of the pipe being tested and detect any change in the flux field caused by an anomaly or defect in the structure of the pipe. The defect diverts the magnetic flux flowing through the wall of the pipe and causes a portion of it to leak to the exterior of the surface of the pipe. This leakage flux is detected by one or more electrical coils, called search coils, which are positioned close to the surface of the pipe and have a relative motion with respect to the pipe so that a voltage is generated in a coil as it passes through the leakage flux.

Search coils are maintained in close proximity to the surface of the pipe by means of structures called search shoes which slide or roll along the surface of the pipe. Quite commonly these shoes are machined or cast structures shaped somewhat like a rigid boat or sled whose bottom side has a fixed curvature which conforms to the curvature of a given size pipe. The search coils are located adjacent to, or in the bottom of, the search shoe in close proximity to the pipe surface when the curved bottom side of the search shoe is in contact with the pipe.

In the past, search shoes were relatively expensive to manufacture, and additionally, because of their rigid nature and the fixed curvatures on their pipe engaging surfaces, one shoe could be used to inspect only pipes of one given diameter. Because one complete pipe inspecting apparatus may utilize eight, twelve, or more search shoes, and because that apparatus must be able to inspect pipes of many different diameters, it was necessary to have available for immediate use many different sets of search shoes, one set for each different pipe size. Furthermore, the shoes are subject to considerable wear and have a limited useful life so that spare search shoes had to be kept in stock. For this reason, a considerable financial investment was required just to provide the search shoes that were required for one unit of pipe inspecting apparatus.

Other disadvantages resulted from the use of the rigid search shoes that had a fixed curvature on their pipe engaging surfaces. To accurately and reliably interpret strip chart recordings of the defect signals that are generated in the search coils it is necessary that the coils always maintain substantially the same close spacing from the pipe surface. This is necessary because the leakage magnetic flux exists quite close to the pipe surface and diminishes significantly in strength as the distance from the surface increases. Therefore, if the separation of the coil from the pipe surface changes, the magnitude of the defect signal changes appreciably and the operator who interprets the strip chart recording can not be sure that a recording of a small defect or flaw signal on the strip chart is in fact a small and possibly acceptable flaw in the structure of the pipe. This is a matter of concern when using rigid search shoes with fixed curvatures on the pipe engaging surfaces because the diameters of pipes of a nominal size can, and often do, vary in diameter within certain allowable limits, and both new and used pipe sometimes is out-of-round. With variations of these types, a rigid search shoe with fixed curvature will not always completely conform to the surface of the pipe being inspected, and consequently, the spacing of search coils from the pipe surface likewise will vary and will cause the variations in magnitude of the flaw or defect signals, as previously mentioned.

SUMMARY OF THE INVENTION

The present invention is a search shoe which overcomes the deficiencies of the prior art mentioned above and is comprised of an object engaging member fashioned from a unitary piece of thin, resilient, nonmagnetic material that is curved across one of its dimensions with a radius of curvature less than that of the smallest pipe to be inspected. Resilient striker leaves extend upwardly from the leading and trailing boundaries of the object engaging surface of the shoe and are constructed to permit the shoe to smoothly pass over protrusions on the pipe surface. Printed circuit search coils are mounted on the bottom surface of a pliable support slab that is in releasable engagement with the surface of the object engaging member that is opposite to the surface in sliding contact with the pipe. The search shoe is suspended to permit motion about orthogonal axes. The flexible and resilient object engaging member is adapted to be urged into a closely-conforming contact with pipes of various different diameters.

DESCRIPTION OF THE PREFERRED EMBODIMENT

Figure 1:
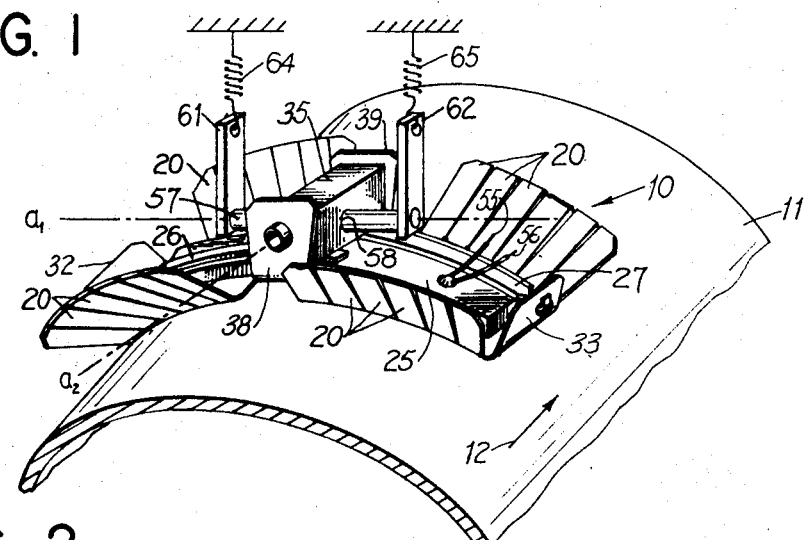
FIG. 1 is a simplified perspective view showing the search shoe of this invention on the surface of a pipe being inspected.

Referring to FIG. 1 of the drawings, the search shoe 10 of this invention is adapted to be in sliding engagement with the outer surface of an elongated cylindrically shaped member 11 which, for purposes of this description, will be assumed to be a tubular steel pipe. It is to be understood that member 11 might also be a solid bar. It will be assumed that the pipe 11 is moving in the direction of the arrow 12, although the relative movement could be otherwise, such as helical for example.

The search shoe 10 is comprised of an object engaging member 15 which is made from a thin sheet of a resilient, nonmagnetic material such as heat treated beryllium copper. The surfaces of object engaging member 15, and particularly the surface in contact with pipe 11, is coated with a thin layer of a wear resistant material such as industrial hard chrome.

Figure 2:
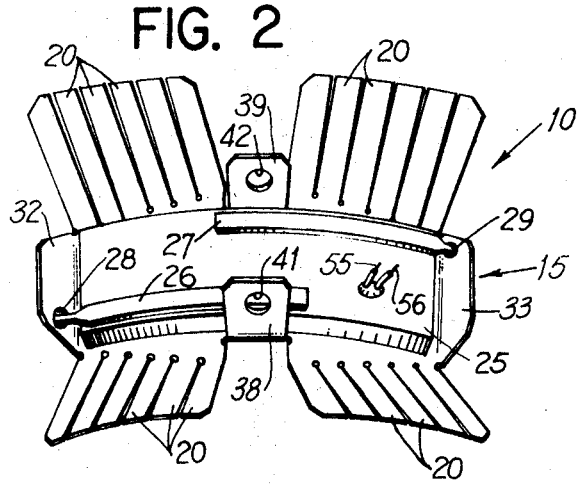
FIG. 2 is a perspective view showing the search shoe of FIG. 1, but with the supporting structure removed to permit a clearer view.

The bottom surface of member 15 that is in contact with pipe 11 is continuous and has a permanent curvature imparted to it in its dimension transverse to the pipe axis, the radius of the curvature being smaller than the radius of the smallest pipe to be inspected. Extending upwardly at oblique angles from the front and rear boundaries of the curved pipe engaging surface of member 15, as viewed in FIGS. 1 and 2, are a plurality of resilient striker leaves 20. The striker leaves 20 and the object engaging surface all are formed in the same unitary sheet of material, as will be described more completely herebelow. As the search shoe 10 and pipe 11 move relative to each other, striker leaves 20 encounter any object such as a joint collar or a girth weld that protrudes from the outer surface of the pipe being inspected and permit search shoe 10 to slide up and over the protrusion and return to the pipe surface with a minimum of physical shock.

On the side of member 15 opposite the object engaging surface is a rectangular slab 25 of a nonmagnetic and nonconductive pliable material such as rubber or any other elastomeric material having the desired properties. Slab 25 is held in place by nonmagnetic spring clips 26 and 27 which have hooks on their outer ends that pass through holes 28 and 29, FIG. 2, and clip to the respective upwardly extending side tabs 32 and 33. The inwardly disposed ends of spring clips 26 and 27 are held in contact with the top surface of pliable slab 25 by a swivel bar 35, FIG. 1, which is rotatably supported between front and back tabs 38 and 39 by suitable bushing means that includes the respective holes 41 and 42, FIG. 2, in the front and back tabs 38 and 39.

Figure 3:
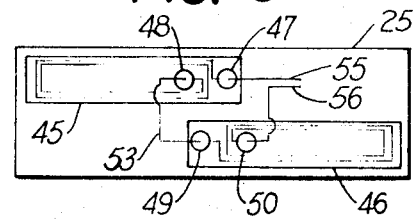
FIG. 3 is a view of the bottom of the coil support member of the search shoe and illustrates the arrangement of the search coils and their connecting terminals.

Pliable slab 25 supports the electrical coils that constitute the search coils of search shoe 10. Fig. 3 is a view of the bottom surface of slab 25 showing printed circuit search coils 45 and 46. The coils first are printed on a thin sheet or film of a plastic backing such as Mylar. Connecting terminals 47-50 also are printed on the backing at the same time. The printed circuit techniques for printing the coils and the terminals may be any that are well known to those skilled in the art. A thin conductor 53 between connecting terminals 48 and 50 connects search coils 45 and 46 in series opposition. Lead wires 55 and 56, FIGS. 1 and 3, are connected to terminals 47 and 49 and provide the connections to the defect signal processing circuitry and the signal recording and/or display means commonly used in defect inspection apparatus of the type under consideration.

The plastic backing with the connected coils 45 and 46 and the terminals 47-50 printed thereon is secured, as by gluing, to the bottom surface of pliable slab 25 with the exposed surfaces of the coils and terminals contacting the bottom side of slab 25 so that all printed conductors are disposed between the Mylar backing and the slab 25. Alternatively, the plastic backing with the printed circuitry thereon could be molded directly into the slab 25 as the slab is formed from a substance in the plastic state which then is allowed to cure to its final pliable state.

Referring again to FIG. 1, a transversely extending rigid rod 57 passes through a centrally positioned hole 58 in swivel bar 35 and is secured against movement with respect to the swivel bar 35. Rigid rod 57 is supported by vertical support members 61 and 62 and is free to rotate with respect thereto. Suitable resilient means, illustrated by springs 64 and 65, are connected at their upper ends to radially-fixed support means, and exert a downwardly directed force on support members 61 and 62, and in turn to search shoe 10, to urge the search shoe into contact with the surface of pipe 11. The support arrangement described allows search shoe 10 to pivot, or rock, independently about the orthogonal axes $a_1$ and $a_2$ to permit object engaging member 15 to remain in conforming contact with a somewhat irregular pipe surface, and to ride over protrusions on the surface of the pipe.

As mentioned previously, the object engaging member 15 is curved across its object engaging surface with a radius of curvature that is shorter than the radius of pipe 11, so that the downwardly directed force exerted by springs 64 and 65 causes the resilient and spring-like object engaging member 15 to flex outwardly until its object engaging surface is in intimate conforming contact over substantially its entire area with the surface of pipe 11. Because of the resilient nature of member 15, this intimate conforming contact will be maintained irrespective of variations in the outer diameter of pipe 11, and even through sections of pipes being inspected may be out-of-round. Search shoe 10 will function in the same manner with a number of different pipe sizes having diameters that fall within a given range of diameters.

An alternate method of applying the downwardly directed force in place of springs 64 and 65 is by using pressure regulated air or hydraulic cylinders with spring return. With this method, search shoe 10 may automatically be lowered onto pipe 11 as the beginning end of the pipe 11 passes under shoe 10 and retracted as the trailing end of the pipe 10 passes under the shoes. This lowering and retraction of the shoes 10 may be triggered by the use of photoelectric cells, micro switches or any other known method of actuating solenoid valves.

In practice, a plurality of search shoes 10 may be positioned circumferentially about pipe 10. Possibly four or more shoes in two or more axially spaced groups are disposed with each shoe covering somewhat less than 180° of the pipe surface, and usually 90° or less, to provide complete 360° coverage of a pipe being inspected.

The printed circuit coils 45 and 46 supported by the pliable slab 25 are particularly well suited for use in the flexible search shoe of this invention. As the object engaging member 15 flexes to maintain its conforming contact with the surfaces of pipes as variations are encountered in the diameters of the pipes being inspected, or as surface irregularities are encountered, coils 45 and 46 and pliable slab 25 also will flex in like manner. The printed circuit conductors of the coils can well withstand the repeated flexing with little likelihood of breaking.

The manner of forming and shaping the object engaging member 15 will be described by referring to FIGS. 4 and 5. The stock material from which the member is made is a flat sheet of beryllium copper having a thickness which may range between .012 and .020 inch. The sheet is stamped or cut to form a blank having the outline illustrated in FIG. 4. Next, all holes are drilled into the blank, preferably using a drill jig to assure accurate and repeatable location of the holes. The lines 75 that extend from the opposite edges of the blank to the respective smallest diameter holes 76 then are marked on the blank. The blank is placed in a forming jig having a concave recess whose curvature is equal to the curvature to be imparted to member 15. A forming tool then is repeatedly rolled over the blank to make it conform to the curvature of the jig, the curvature being across the dimension between side tabs 32 and 33 in FIG. 4. The curved blank next is slit or cut along the previously-marked lines 75 to form the individual striker leaves 20 and the front and back tabs 38 and 39. The striker leaves 20, the front and back tabs 38 and 39, and the side tabs 32 and 33 are bent up to the positions illustrated in FIGS. 1 and 2, again using a forming jig and tool, if desired. The formed blank then is coated with a wear resistant material such as industrial hard chrome to a thickness between one and one and one-half mils. The substantially completed object engaging member then is heat treated at 600° F. for two hours to give it resilience and a spring-like characteristic.

Figure 4:
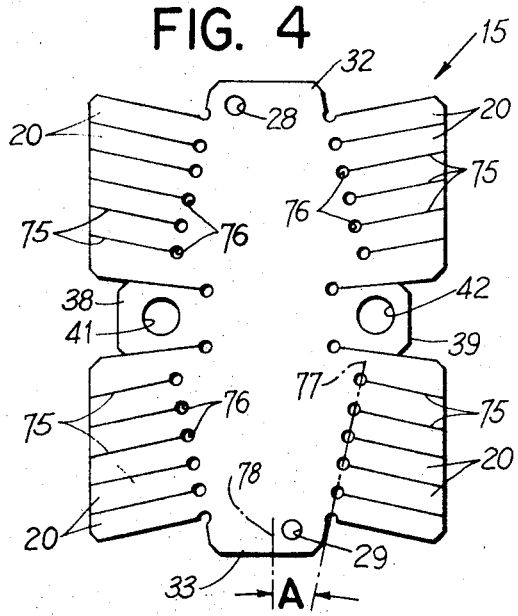
FIG. 4 is a top view of a cut-out form, or blank, from which the object engaging member of the search shoe is formed.
Figure 5:
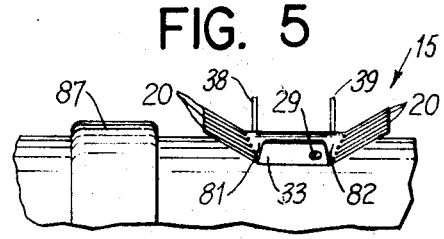
FIG. 5 is a simplified illustration of the object engaging member of the search shoe illustrating a detail of the striker leaves on the leading and trailing edges thereof.

It will be seen that the holes 76 that are at the bottoms of the slits that form the striker leaves 20 are in respective groups that are on a line such as line 77, FIG. 4 for example, that intersects the center line 78 at an angle A that typically may be approximately 12°. This is an important feature of the object engaging member 15 because a wedge-like effect is created at the bases or roots of the striker leaves on the leading and trailing boundaries of the object engaging surface, see the regions 81 and 82 in the side view of the member, FIG. 5. With a construction such as this, the bases or roots of the centermost striker leaves on the leading and trailing boundaries are spaced further apart in the direction of relative movement of search shoe 10 than are those of the striker leaves near the side tabs 32 and 33. Therefore, when the object engaging member 15 encounters something protruding from the surface of a pipe, such as a coupling collar 87, the wedge-shape effect that is created allows the member to slide up and over over the protrusion without difficulty. It was found that if the bases of all striker leaves on a boundary of the object engaging surface are in a plane that is normal to the axis of the pipe being inspected, the outermost corners of member 15 often caught on the collar of a joint, or other protrusion, and caused damage to the search shoe 10. The wedge-like effect illustrated at the regions 81 and 82 of FIG. 5 completely overcomes this problem.

When an object engaging member 15 becomes excessively worn due to the abrasive contact with pipe surfaces, it is a simple matter to disconnect it from the swivel bar 35, FIG. 1, and insert a new member onto the swivel bar. This may be done quickly since the same spring clips 26 and 27 and coil supporting slab 25 are easily inserted into place on the new object engaging member 15.

The search shoe of this invention has been found to be quite satisfactory in use, both from a physical and from an electrical point of view. Because of the flexible and resilient nature of object engaging member 15, and because of the location and supporting arrangement for the printed circuit search coils 45 and 46, the coils remain in close proximity to the surface of the pipe being inspected and produce reliable defect signals. In inspection apparatus that employs a plurality of the search shoes of this invention, it has been found that when one or more of the object engaging members 15 were replaced, little, if any, recalibration of the respective electrical signal circuits was required. This feature saves considerable time and effort and minimizes the "down-time" of the inspection apparatus.

What is claimed is:

1. An object engaging member for use on a search shoe that is used with apparatus for nondestructively testing cylindrically shaped objects having diameters within a given range of diameters, said member being adapted to engage in a sliding contact with the object being tested, said member comprising
    a member formed of a thin, flexible, sheet-like material and having an object engaging surface that is curved across its dimension transverse to the cylindrical axis of an object being tested when the member is in contact therewith, said curved surface subtending an angle less than 180°,
    the radius of curvature of the member across said dimension being shorter than that of the smallest of the objects to be tested whose diameters are within said given range, and said member being resilient so that it may be urged into closely-conforming contact with the surfaces of all objects to be tested whose diameters are within said given range, and
    resilient striker means extending obliquely from said object engaging surface from the boundaries thereof that are the leading and trailing boundaries as the member moves relative to an object being tested.

2. Apparatus as claimed in claim 1 wherein
    each of said boundaries of the object engaging surface includes first and second boundary portions each of which extends from the side of said member toward the center region thereof and each of which is obliquely disposed relative to a transverse center line through said member so that said leading and trailing boundaries are spaced further apart at the center region of the object engaging surface than at the sides thereof.

3. Apparatus as claimed in claim 2 wherein
    the outer extremities of the striker means on each one of said boundaries are approximately equidistant from said transverse center line.

4. The combination claimed in claim 1 wherein
    said striker means includes a plurality of individual resilient striker leaves,
    the striker leaves on each of said boundaries following a curved contour in the same direction in which said object engaging surface is curved, said direction being transverse to the lengths of said striker leaves.

5. Apparatus as claimed in claim 4 wherein
    the bases of the striker leaves on each boundary lie along first and second lines that are respectively obliquely disposed with respect to a center line transversely across said member, the bases of the striker leaves nearest the edges of said member being closest to said center line.

6. Apparatus as claimed in claim 5 and further including,
    side means formed in the same unitary sheet-like material of said member for supporting an electrical search coil on the surface of said member opposite the object engaging surface.

7. Apparatus as claimed in claim 6 and further including a pliable slab of nonmagnetic and nonconductive material disposed on said opposite surface,
    at least one printed circuit search coil adjacent the bottom surface of said pliable slab and proximate said opposite surface of the object engaging member, and
    means for releasably holding said slab on said opposite surface.

8. Apparatus as claimed in claim 7 wherein the means that releasably holds said slab on the opposite surface of the member includes spring clips that engage said side means and extend transversely across said slab.

9. The combination claimed in claim 7 and further including means adapted to resiliently support said object engaging member and to urge it into a closely conforming contact with an object being tested, said supporting means permitting freedom of movement of said object engaging member about orthogonal axes.

10. A search shoe to be used in nondestructive testing apparatus for detecting defects in elongated cylindrically shaped objects having diameters within a given range of diameters, said search shoe and an object under test being adapted to have a relative motion in a given direction with respect to each other, the combination comprising
    an object engaging member having an object engaging surface that is curved across its dimension that is transverse to said given direction, the radius of curvature of said surface being shorter than the smallest radius within said given range and the curved surface subtending an angle less than 180°,
    said member being formed from a unitary sheet-like piece of nonmagnetic resilient material so that the object engaging surface may be resiliently urged into conforming contact with a portion of the cylindrical surface of an object having a diameter within said given range,
a plurality of resilient striker leaves formed in said unitary piece of material and extending upwardly at oblique angles from opposite boundaries of the object engaging surface, said boundaries being transverse to said given direction,
a pliable coil supporting member removably attached to said object engaging member on the surface thereof opposite the object engaging surface,
at least one planar electrical coil supported by the coil supporting member in a position closely adjacent said opposite surface of the object engaging member to be in coupling relationship with leakage magnetic flux fields emanating from an object under test.

References Cited

UNITED STATES PATENTS 3,361,959  1/1968  Placke _____ 324—37

RUDOLPH V. ROLINEC, Primary Examiner

R. J. CORCORAN, Assistant Examiner

U.S. Cl. X.R.

29—595; 179—100.2; 336—208; 340—174.1